Figure 1:
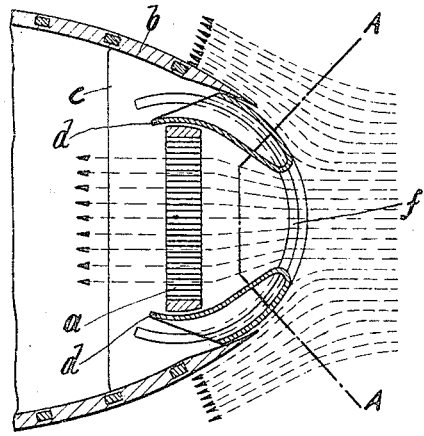

March 11, 1924.

L. DÜRR 1,486,644

DEVICE FOR CONTROLLING THE COOLING AIR, ESPECIALLY FOR THE
GONDOLAS OF AIRCRAFT

Filed Sept. 27, 1923

INVENTOR:

Ludwig Dürr

Patented Mar. 11, 1924.

1,486,644

UNITED STATES PATENT OFFICE.

LUDWIG DÜRR, OF FRIEDRICHSHAFEN, GERMANY, ASSIGNOR TO LUFTSCHIFFBAU ZEPPELIN GESELLSCHAFT MIT BESCHRANKTER HAFTUNG, OF FRIEDRICHSHAFEN, BODENSEE, GERMANY.

DEVICE FOR CONTROLLING THE COOLING AIR, ESPECIALLY FOR THE GONDOLAS OF AIRCRAFT.

Application filed September 27, 1923. Serial No. 665,239.

*To all whom it may concern:*

Be it known that I, LUDWIG DÜRR, citizen of Germany, residing at Friedrichshafen, on the lake of Constanz, Germany, have invented new and useful Improvements in Devices for Controlling the Cooling Air, Especially for the Gondolas of Aircraft, of which the following is a specification.

The hitherto known devices for controlling the requisite quantity of air for the radiators put up in the gondolas of aircraft are efficient by changing the cross-section of the opening for the entrance of the air, and there was paid only slight heed to such a formation of the air-passages, that in each position of the controlling device a flow of the air is obtained, which is approximately free from eddies. There are, it is true, already known devices, in which the movable covering parts are in such a relation to the stationary air-conducting parts, that in every position of the covering parts a good conduct of the air is secured, but as in the known examples this is only the case for that quantity of air, which is caused to flow through the radiator. That quantity of air, however, which flows through the radiator, is not guided by any conducting device, and its energy is preferably transformed into eddies, instead of maintaing the flow necessary for the cooling effect. Such devices, possessing a nozzle-shaped air-guiding tube, the mouth of which is enlarged or contracted, are therefore unavailable for radiators put up in the gondolas of aircraft, because the conduct of the air flowing around the gondola is lost, if the cross-section of the opening for the entrance of the air is contracted.

None of the devices, being hitherto known, enables in each position of the covering parts a smooth movement of the air without any eddies around the gondola as well as through the latter, so that losses are unavoidable, influencing the total effect of the aircraft in an injurious manner.

The invention avoids this disadvantage by the fact, that the movable covering parts are brought into connection with conducting faces curved in such a manner that they form the walls of a nozzle, which in each position produce a smooth conduct of the air, flowing through the radiator, and without eddies. A continuous conduct around the gondola is produced in the known manner by guiding the movable covering parts on a circular path, conformed to the curvature of the front part of the gondola in such a manner that at each position of the covering parts a conduct is produced also for the air, flowing around the gondola. Herewith it is of great importance, that the path, on which the covering parts are guided, has another centre as the front part of the stationary wall of the gondola, in order that on the one hand a better stream-line-form, which as everybody knows, has the smallest radius of curvature at the point, and on the other hand a sufficient height of the structure for the walls of the gondola is produced for lodging the device between the path and the outer wall.

The structure of the controlling device is extremely simple according to the invention, if the nozzle is formed by four walls, two of which are narrow faces parallel to each other, while the others are two curved faces, vertical to the first faces, the plane faces being in connection with the stationary wall of the gondola, while the curved walls of the nozzle cooperate with the movable covering parts. This structure also enables for instance a simple suitable arrangement of the guides for the movable covering parts on the plane walls, where they are tightened in a suitable manner.

The curved walls of the nozzle, cooperating with the movable covering parts may, if necessary, be made elastic and fixed to the radiator in such a manner, that at each position of the covering parts an uninterrupted wall of nozzle is formed. An especially simple structure may be obtained by dividing the curved walls of the nozzle into several parts, curved in such a manner, that they may be pushed one behind the other, so that at each position of the covering parts a nearly uniform curvature exists.

Referring to the accompanying drawing.

Figure 2:
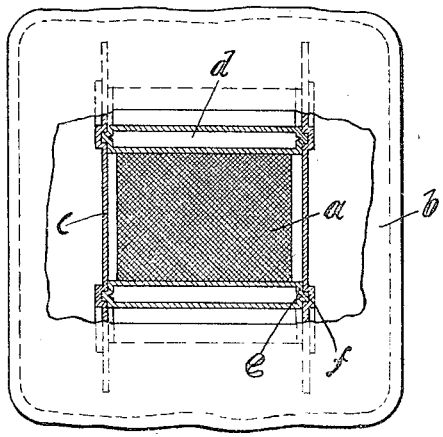
Figure 3:
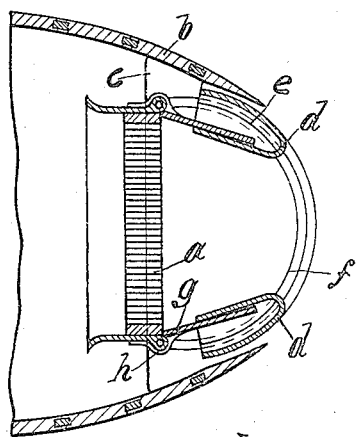
Figure 4:
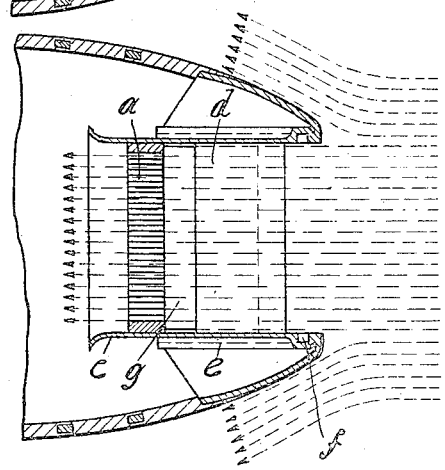

Fig. 1 is a vertical section through the front part of the gondola of an aircraft, furnished with a device according to the present invention, Fig. 2 a section to the line A—A of Fig. 1, Fig. 3 shows a modification of the device in a vertical section and Fig. 4 in a horizontal section.

The nozzle, at the rear end of which the radiator $a$ is arranged, is formed by an opening in the front-wall $b$ of the gondola having dimensions corresponding to the radiator, and to which on two opposite sides plane stationary walls $c$ are attached, extending from the opening to the radiator $a$. The other two walls of the nozzle consist of movable covering parts $d$ of a curved shape, shown in Fig. 1, corresponding to the curvature of the wall of the nozzle. These parts $d$ are guided by means of a flange $e$, serving simultaneously as tightening, in a guide-notch $f$ of the plane walls $c$, the radius of curvature of which is somewhat smaller than that of the stationary part of the front wall of the gondola.

The modification of the device shown in Figs. 3 and 4 differs from the above described one by the fact, that the movable covering parts $d$ slide not only in the walls of the gondola but also along a tightening strip $g$, which is flexibly arranged at the frame of the radiator and is acted upon by a spring $h$, so that it gives together with the movable parts $d$ in every position of the latter a satisfying form of a nozzle.

What I claim as my invention and desire to secure by Letters Patent is:

1. Device for controlling the cooling air, especially for the gondolas of aircraft, comprising a radiator, an opening in the stream-line-shaped front part of the gondola, two curved and two plane walls, connecting the frame of the radiator with the circumference of the said opening, movable covering parts, guided in the plane walls and curved in such a manner, as to give in each position together with the stationary curved walls a satisfying form of nozzle for the air, flowing through the radiator.

2. Device for controlling the cooling air, especially for the gondolas of aircraft, comprising a radiator, an opening in the stream-line-shaped front part of the gondola, two curved and two plane walls, connecting the frame of the radiator with the circumference of the said opening, movable covering parts guided in the plane walls and curved in such a manner, as to give in each position together with the stationary curved walls a satisfying form of nozzle for the air flowing through the radiator, the guides in the plane walls for the movable covering parts, having a radius of curvature smaller than that of the stationary curved walls.

3. Device for controlling the cooling air, especially for the gondolas of aircraft, comprising a radiator, an opening in the stream-line-shaped front part of the gondola, two curved and two plane walls, connecting the frame of the radiator with the circumference of the said opening, movable covering parts, curved in such a manner, as to give in each position together with the stationary curved walls a satisfying form of nozzle, curved guide-notches in the plane walls of the nozzle and flanges on the movable covering parts engaging with the said notches and serving simultaneously to bind the movable parts in adjusted position.

4. Device for controlling the cooling air, especially for the gondolas of aircraft, comprising a radiator, an opening in the stream-line-shaped front part of the gondola, two curved and two plane walls, connecting the frame of the radiator with the circumference of the said opening, movable covering parts, curved in such a manner, as to give in each position together with the stationary curved walls a satisfying form of nozzle, and guides in the plane walls for the movable covering parts, and a tightening strip flexibly arranged at the sides of the frame of the radiator and cooperating with the said movable covering parts.

5. A gondola for air ships having a rounded forward end, a radiator within the gondola, an opening in the end of the gondola adapted to admit air to the radiator, movable shutters for such opening adapted to close said opening following the line of curvature of the gondola, and means for connecting the free edges of the shutters with the radiator so that for all positions of such shutters a substantially continuous stream line wall is formed from such free edges to the radiator.

6. A gondola for air ships having a rounded forward end, a radiator within the gondola, an opening in the end of the gondola adapted to admit air to the radiator, movable shutters for such opening adapted to close said opening following the line of curvature of the gondola, and walls within the gondola extending forward from the edges of the radiator and making a substantial connection between the shutters and the radiator for leading air from said shutters to the radiator.

In testimony whereof I affix my signature in presence of two witnesses.

LUDWIG DÜRR.

Witnesses:
RICHARD FROEHTENIGT.
E. WILHELM BERG.